(12) United States Patent
Pedrazzini et al.

(10) Patent No.: US 7,084,762 B2
(45) Date of Patent: Aug. 1, 2006

(54) ELECTRONIC DEVICE INCLUDING MOTION SENSITIVE POWER SWITCHING INTEGRATED CIRCUIT AND RELATED METHODS

(75) Inventors: Giorgio Pedrazzini, Rancho Santa Margarita, CA (US); Ernesto Lasalandra, San Donato Milanese (IT); Bendetto Vigna, Potenza (IT)

(73) Assignee: STMicroelectronics, Inc., Carrollton, TX (US)

( * ) Notice: Subject to any disclaimer, the term of this patent is extended or adjusted under 35 U.S.C. 154(b) by 271 days.

(21) Appl. No.: 10/340,131

(22) Filed: Jan. 10, 2003

(65) Prior Publication Data

US 2004/0134281 A1  Jul. 15, 2004

(51) Int. Cl.
 *G08B 13/08* (2006.01)
(52) U.S. Cl. ............... 340/545.5; 340/566; 340/686.1; 73/652
(58) Field of Classification Search ............. 340/545.5, 340/566, 686.1, 870.05, 870.11; 73/652; 307/121; 363/21, 50, 53, 56; 385/18; 257/415
See application file for complete search history.

(56) References Cited

U.S. PATENT DOCUMENTS

| | | | |
|---|---|---|---|
| 5,281,900 A | 1/1994 | Park | 318/139 |
| 6,028,343 A | 2/2000 | Chan et al. | 257/417 |
| 6,255,962 B1 | 7/2001 | Tanenhaus et al. | 340/870 |
| 6,314,887 B1 | 11/2001 | Robinson | 102/262 |
| 6,411,214 B1 * | 6/2002 | Yao et al. | 340/664 |
| 6,454,482 B1 | 9/2002 | Silverbrook et al. | 401/195 |
| 6,469,330 B1 | 10/2002 | Vigna et al. | 257/254 |
| 6,469,639 B1 | 10/2002 | Tenenhaus et al. | 340/870 |
| 6,654,685 B1 * | 11/2003 | McIntyre | 701/213 |
| 6,738,714 B1 * | 5/2004 | McCall et al. | 701/220 |
| 6,741,169 B1 * | 5/2004 | Magiawala et al. | 340/438 |
| 6,750,775 B1 * | 6/2004 | Chan et al. | 340/669 |

FOREIGN PATENT DOCUMENTS

WO          00/21020          4/2000

OTHER PUBLICATIONS

Small Times news on "Smart Guns would put Firepower only in hands of Rightful Owners", by Tom Henderson; pp. 1-5.
Sensors EHPO & Conference on "MEMS Sensors Are Driving the Automotive Industry"; Harvey Weinberg, Analog Devices Inc.; Oct. 22, 2002; pp. 1-10.

* cited by examiner

*Primary Examiner*—Anh V. La
(74) *Attorney, Agent, or Firm*—Lisa K. Jorgenson; Christopher F. Regan (57) ABSTRACT

An electronic device includes a motion sensitive power switching integrated circuit, which, in turn, includes a power switch connected between an input and an output, and a MEMS inertial sensing switch movable from a first position to a second position based upon motion thereof. The motion sensitive power switching integrated circuit also includes a detector operating the power switch to supply power to the output from the input based upon the MEMS inertial sensing switch moving from the first position to the second position. The first and second positions may be, respectively, a normally open position and a closed position. The device may be unpowered until the MEMS inertial sensing switch moves from the open to the closed position. The detector may generate a power on reset (POR) signal based upon the MEMS inertial sensing switch moving from the open to the closed position.

40 Claims, 8 Drawing Sheets

ELECTRONIC DEVICE INCLUDING MOTION SENSITIVE POWER SWITCHING INTEGRATED CIRCUIT AND RELATED METHODS

FIELD OF THE INVENTION

The present invention relates to the field of microelectronic circuits, and, more particularly, to a power control circuit including a micro-electro-mechanical switch.

BACKGROUND OF THE INVENTION

Electronic users continue to demand ever smaller, more portable devices, such as hand-held mobile phones and personal computers as well as smart cards and a host of other electronic devices. For portability, these electronic devices may carry their own power supply or be used with an adapter that, for example, allows such a device to be connected to a wall socket. The latter approach usually makes use of such a device more cumbersome, while the former approach may constrain how small the device may be if, for example, a relatively large portable battery must be used as the internal power source.

Limiting the size of such a portable electronic device's internal power source typically calls for reducing the device's power consumption—especially, for example, during times when the device is idle. A device user, nonetheless, typically desires that the device be capable of being powered up quickly and readily usable even after the device has been idle for an extended period of time. Thus, a power control circuit may be interposed between a portable power supply and the operational circuitry of the device. The power control circuit may control the supply of power by reducing the supply of power to the operational circuit when the device is idle so that overall power consumption is thereby reduced.

One approach is to include as part of the power control circuit a wake-up sensor that senses an external stimulus that generally corresponds to a user's intent to use the device, the power control circuit responding to the sensor by powering up the device so that the operational circuitry goes into an active mode. U.S. Pat. No. 6,469,639 to Tanenhaus et al., for example, discloses that the wake up sensor may be a micro-electro-mechanical (MEM) accelerometer, which senses the acceleration of the device when it is picked up or moved by a user. More particularly, the accelerometer is a low-powered, integrated circuit or "MEMS chip" that provides a sensing signal to a buffering circuit, which, in turn, is connected to a threshold detecting circuit for detecting whether and when the buffered sensing signal reaches or exceeds a predetermined threshold value.

The MEMS accelerometer may be used for other devices as well. For example, a so-called "smart gun" developed by the New Jersey Institute of Technology includes a MEMS accelerometer that determines when the gun has been picked up and accordingly wakes up other circuitry, which goes into a sleep mode when the gun is at rest. The other circuitry includes pressure sensors that, when powered up, determine whether the size of the hand holding the gun matches stored biometric data.

A conventional wake-up sensor, such as the MEMS accelerometer, frequently operates by detecting changes in voltage and/or current levels. Accordingly, such a conventional wake-up sensor usually needs to be powered even when the device with which it is used is in idle mode. This, however, also consumes power and reduces battery life for battery-powered electronics.

SUMMARY OF THE INVENTION

With the foregoing background in mind, it therefore is an object of the present invention to provide more effective and efficient reduction of power consumption of an electronic device.

This and other objects, features, and advantages in accordance with the present invention are provided by a motion sensitive power switching integrated circuit that includes a power switch connected between an input and output, at least one MEMS inertial sensing switch movable from a first to a second position, and a detector operating the power switch to supply power to the output from the input based upon the at least one MEMS inertial sensing switch moving from the first to the second position.

For example, the at least one MEMS inertial sensing switch may move from a normally open position to a closed position. Accordingly, the detector may remain unpowered until the at least one MEMS inertial sensing switch moves the closed position. Power is not consumed by either the at least MEMS inertial sensing switch or the detector when the device is off and not moved. Yet, the device still can be quickly powered based upon movement of the device.

The detector may operate by latching the power switch on based upon the at least one MEMS inertial sensing switch moving to the closed position. The detector may further generate a power on reset (POR) signal based upon the at least one MEMS inertial sensing switch moving to the closed position.

The at least one MEMS inertial sensing switch may comprise a plurality of MEMS inertial sensing switches that are connected in parallel with one another. Each of the MEMS inertial sensing switches may be responsive to movement along a respective different axis of movement of the device.

The power switch may comprise at least one transistor having respective conduction terminals connected in series between the input and output. The transistor may additionally have a control terminal that connects both to the at least one MEMS inertial sensing switch and to the detector. The power switch, moreover, may comprise at least one MOS transistor.

The input may comprise a first external pin, and the output may comprise a second external pin. Additionally, the motion sensitive power switching integrated circuit may further comprise an external ground pin connected to the at least one MEMS inertial sensing switch and the detector. In other words, relatively few pins are used in some embodiments.

An additional aspect of the present invention relates to a method of selectively powering circuitry connected to an output of a power switch based upon motion. The method may include operating the power switch to supply power to the output based upon detecting at least one MEMS inertial sensing switch moving from a first position to a second position (e.g., from a normally open to a closed position) based upon motion thereof.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
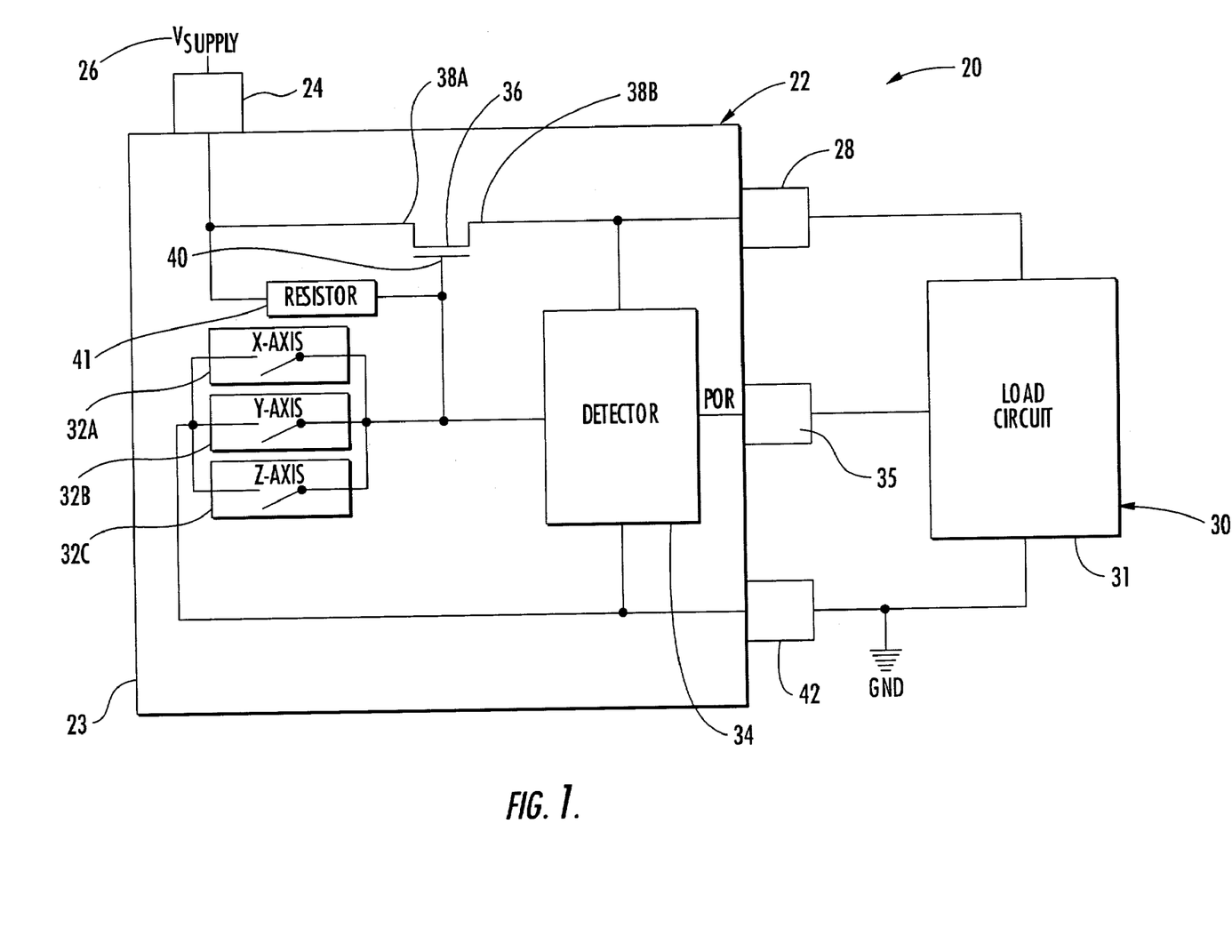
FIG. 1 is a schematic diagram of an electronic device including a motion sensitive power switching integrated circuit according to the present invention.

Referring initially to FIG. 1, an electronic device 20 according to the present invention is described. The electronic device 20 illustratively comprises a motion sensitive power switching integrated circuit 22, which, in turn, illustratively includes an input 24 for connecting to a power supply 26, and an output 28 for connecting to a load circuit 30 that is to be selectively powered by the power supply. The input 24 illustratively comprises a first external pin, and the output 28 illustratively comprises a second external pin.

The motion sensitive power switching integrated circuit 22 of the electronic device 20 also illustratively includes a plurality of MEMS inertial sensing switches 32A, 32B, 32C, each of which is movable from a first position to a second position. A detector 34 operates a power switch, illustratively provided by a MOS transistor 36, to supply power to the output 28 based upon at least one of the MEMS inertial sensing switches 32A, 32B, 32C moving from the first to the second position.

Illustratively, the detector 34 remains unpowered until at least one of the MEMS inertial sensing switches 32A, 32B, 32C moves from its first to its second position. By way of example, each MEMS inertial sensing switch 32A, 32B, 32C may comprise a floating contact adjacent a fixed contact region. Movement of the electronic device 20 causes the floating contact to contact the fixed contact region, thereby briefly closing the motion sensitive power switching integrated circuit 22. Thus, illustratively, the first position of a MEMS inertial sensing switch 32A, 32B, 32C may be a normally open position, and the second position may be a closed position. As will be readily appreciated by those skilled in the art, various other types of MEMS inertial switches may also be used. Additional examples of such MEMS inertial sensing switches may be found, for instance, in U.S. Pat. No. 6,028,343 to Chan et al. and U.S. Pat. No. 6,314,887 to Robinson, each of which is incorporated herein in its entirety.

The detector 34 illustratively operates the power switch 36, latching the power switch so that the power continues to be supplied from the input 24 to the output 28 even if only one of the MEMS inertial sensing switch 32A, 32B, 32C has momentarily closed and then returned to its normally open position. Illustratively, the detector 34 also generates a power on reset (POR) signal based on at least one of the MEMS inertial sensing switches 32A, 32B, 32C closing in response to motion thereof. The motion sensitive power switching integrated circuit 22 illustratively comprises a POR external pin 35 connected to the detector 34. The electronic device 20 may continue to be powered until shut down by a user.

As a result of the operation of the MEMS inertial sensing switches 32A, 32B, 32C, as described, the motion sensitive power switching integrated circuit 22 provides distinct advantages over conventional MEMS accelerometers used in wake-up circuits that are continuously supplied power. By contrast, because the MEMS inertial sensing switches 32A, 32B, 32C initiate the supply of power in response to motion, the motion sensitive power switching integrated circuit 22 of the present invention need not be continuously powered with even a very low current or voltage. Neither the MEMS inertial sensing switches 32A, 32B, 32C nor the detector 34 need consume power when the device is off and not moved. Nonetheless, even the momentary change in position of at least one of the MEMS inertial sensing switches 32A, 32B, 32C can bring the electronic device to life.

Illustratively, the MEMS inertial sensing switches 32A, 32B, 32C of the motion sensitive power switching integrated circuit 22 are connected in parallel with one another. The motion sensitive power switching integrated circuit 22 also illustratively comprises a plurality of three such MEMS inertial sensing switches 32A, 32B, 32C. The advantage of this configuration is that each MEMS inertial sensing switch 32A, 32B, 32C may correspond to one of the three orthogonal axes (X, Y, and Z, respectively) that span physical space so that movement of the electronic device 20 in any direction will initiate a supply of power to the device. As will be readily appreciated by those skilled in the art, however, more than three or as few as one MEMS inertial sensing switch may be used depending on the particular needs of a user.

The power switch illustratively comprises a transistor 36 having respective conduction terminals 38A, 38B connected in series between the input 24 and the output 28. The transistor further has a control terminal 40 connected to the MEMS inertial sensing switches 32A, 32B, 32C, and to the detector 34. A resistor 41 is connected between the control gate 40 and the conduction terminal 38A of the transistor 36. As will be readily understood by those skilled in the art, the motion sensitive power switching integrated circuit 22 may include more than one such transistor. The one or more transistors, for example, may be MOS transistors, as also will be readily understood by those skilled in the art. Additionally, the motion sensitive power switching integrated circuit 22 illustratively includes an external ground pin 42 that is connected to the MEMS inertial sensing switches 32A, 32B, 32C and to the detector 34.

As shown in FIG. 1, the electronic device 20 illustratively comprises a semiconductor substrate 23 on which the power switch 30, the MEMS inertial sensing switches 32A, 32B, 32C, and the detector 34 are formed. The load circuitry 30 is illustratively on another substrate 31 and is connected to the output 28 of the power switch 36. As will be readily appreciated by those skilled in the art, additional circuitry on yet other substrates also may be connected to the output 28 of the power switch 36.

Figure 2:
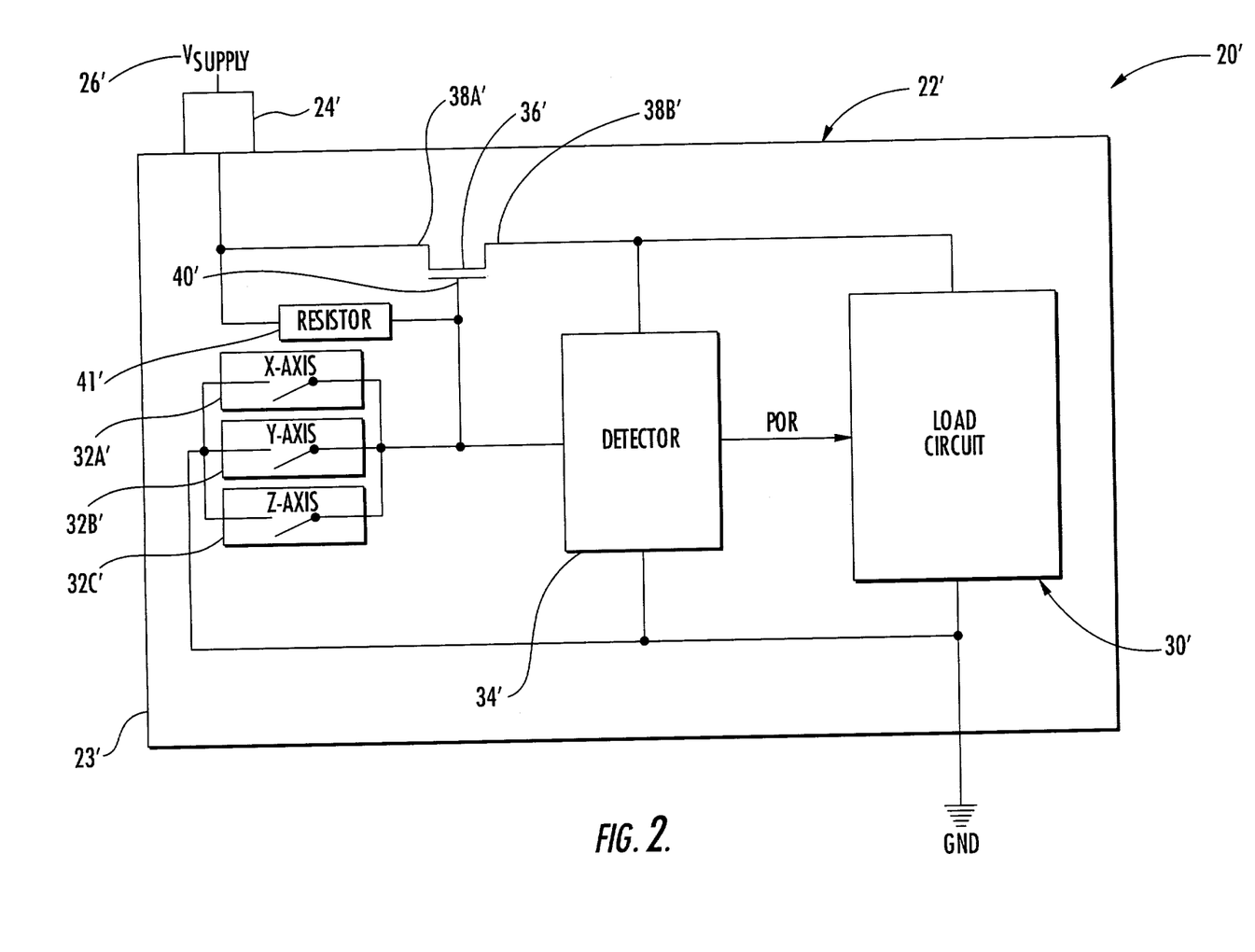
FIG. 2 is a schematic diagram of another embodiment of an electronic device including a motion sensitive power switching integrated circuit according to the present invention.

In another embodiment, as illustrated in FIG. 2, the electronic device 20' comprises a substrate 23' on which the power switch 36', MEMS inertial sensing switches 32A', 32B', and 32C', and detector 34' are formed. Additionally, however, the load circuitry 30' is also illustratively on the same substrate 23' and connected to the power switch 36' formed thereon.

Figure 3:
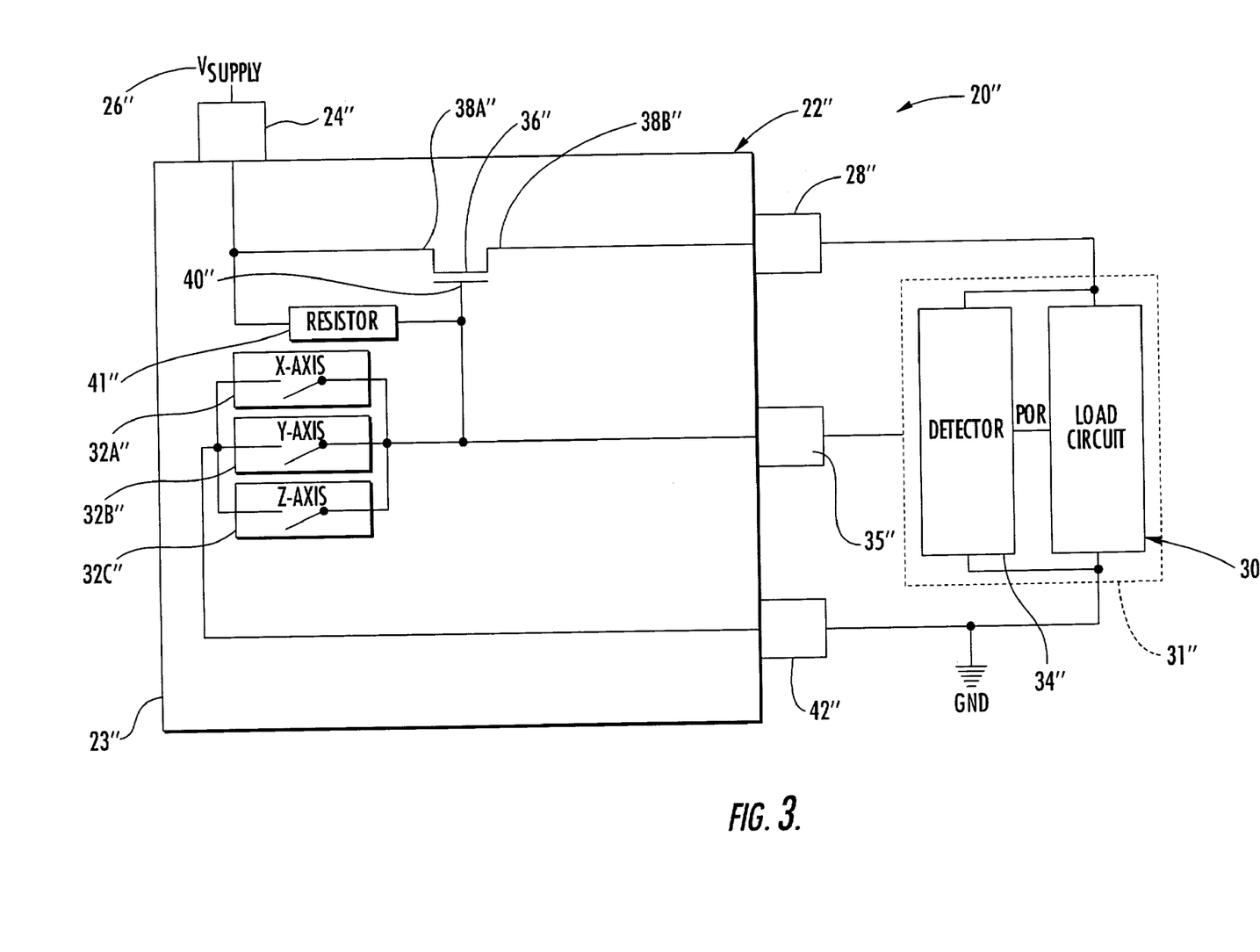
FIG. 3 is a schematic diagram yet another embodiment of an electronic device including a motion sensitive power switching integrated circuit according to the present invention.

In yet another embodiment of the electronic device 20", as illustrated in FIG. 3, the detector 34" is on the same substrate 31" that includes the load circuit 30". In this embodiment, the external pin 35" acts not as a POR pin, but rather as a circuit node connection pin. The POR signal, though, is again generated by the detector 34" based on at least one of the MEMS inertial sensing switches 32A", 32B", 32C" closing in response to motion thereof. The POR signal is supplied to the load circuit 30", as shown.

Figure 4:
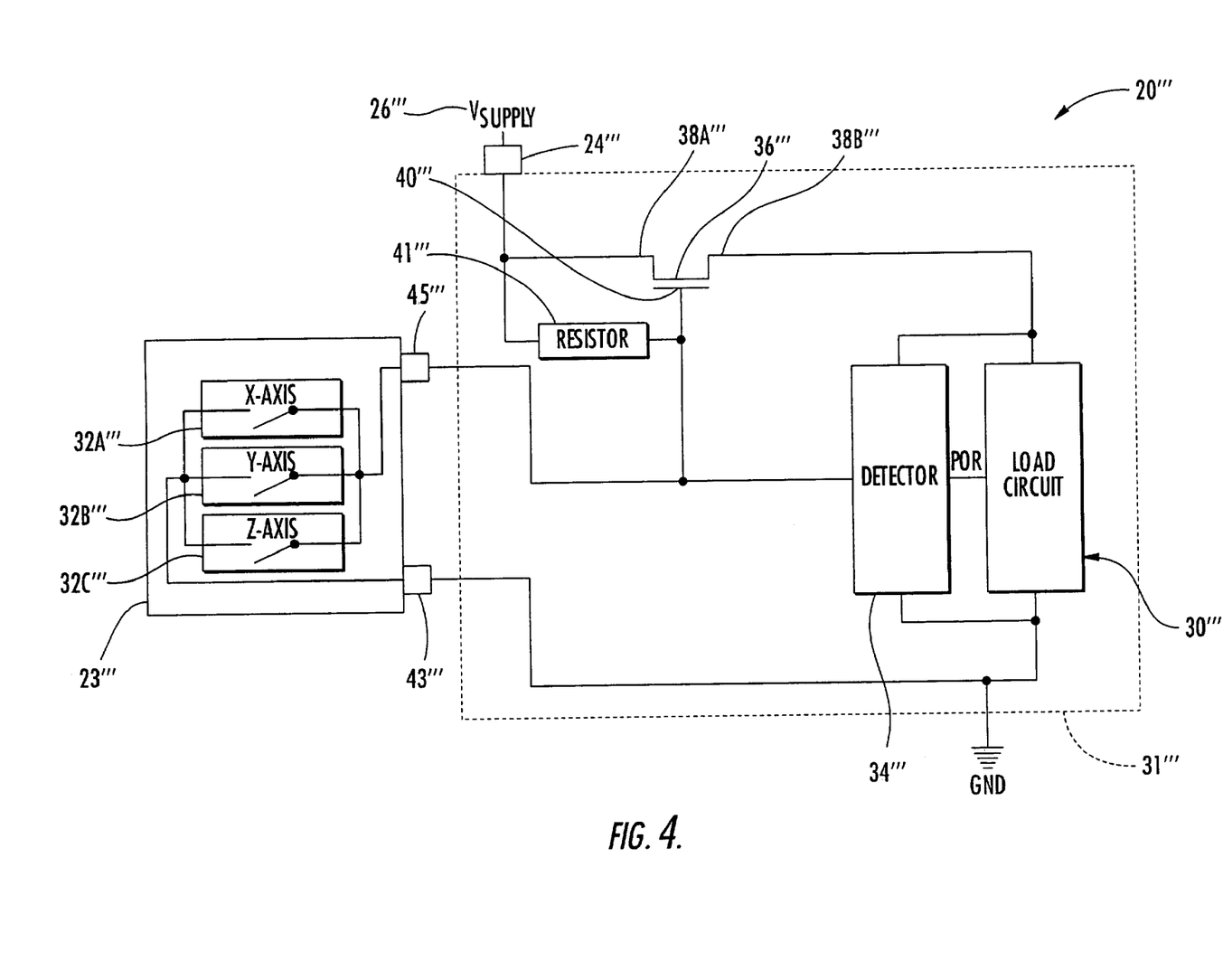
FIG. 4 is a schematic diagram of still another embodiment of an electronic device including a motion sensitive power switching integrated circuit according to the present invention

In still another embodiment, as illustrated in FIG. 4, the MEMS inertial sensing switches 32A''', 32B''', 32C''' are packaged on a substrate 23''' having two output pins 45''', 43'''. The output pins 45''', 43''' electrically connect the MEMS inertial sensing switches 32A''', 32B''', 32C''' to the power switch 36''', the detector, 34''', and the load circuit 30''' that are each illustratively on another substrate 31'''.

Figure 5:
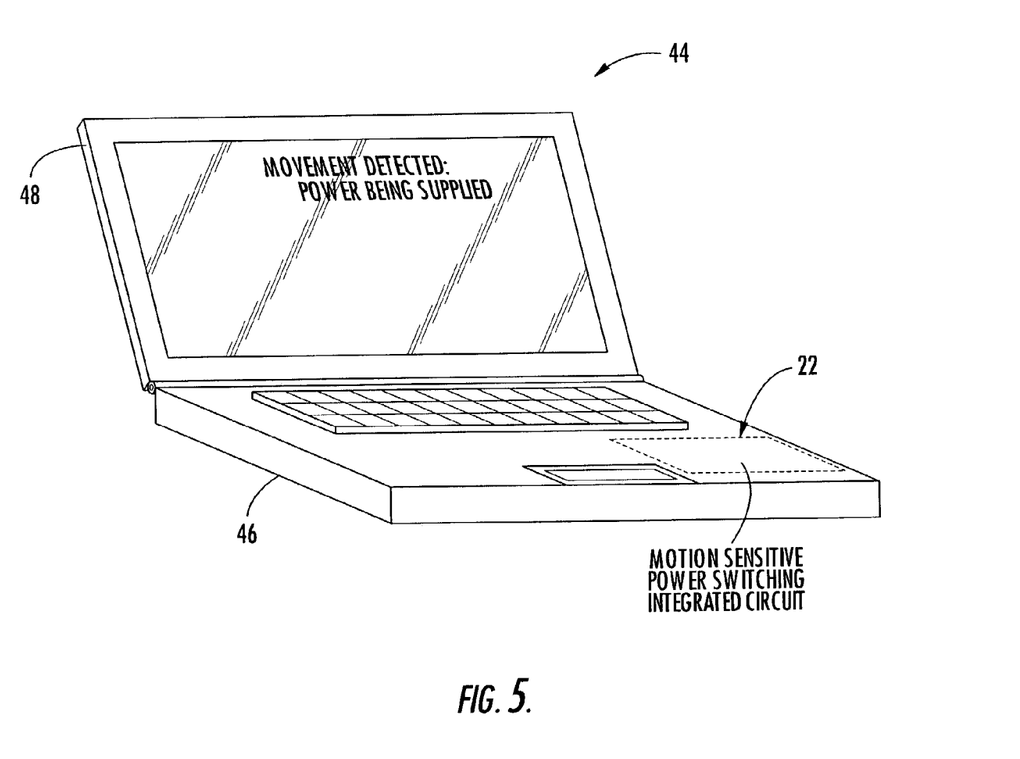
FIG. 5 is a perspective schematic view of an electronic device (i.e., portable computer) including the motion sensitive power switching integrated circuit of FIG. 1.

An example of an electronic device in which the motion sensitive power switching integrated circuit 22 may be used is a portable, laptop computer 44, as illustrated in FIG. 5. As will be readily understood from the preceding discussion, movement of the laptop computer 44 moves at least one of the MEMS inertial sensing switches 32A, 32B, 32C from its normally open position to the closed position and, as a result, the detector 34 operates the power switch 36 to supply power to the output 28 from the input 24 so that the circuitry of the laptop computer turns on. The motion sensitive power switching integrated circuit 22 may be in the lower housing 46 of the laptop computer 44, as shown, or, instead, it may be in the upper housing 48 so that power is supplied when the upper housing is opened.

Figure 6:
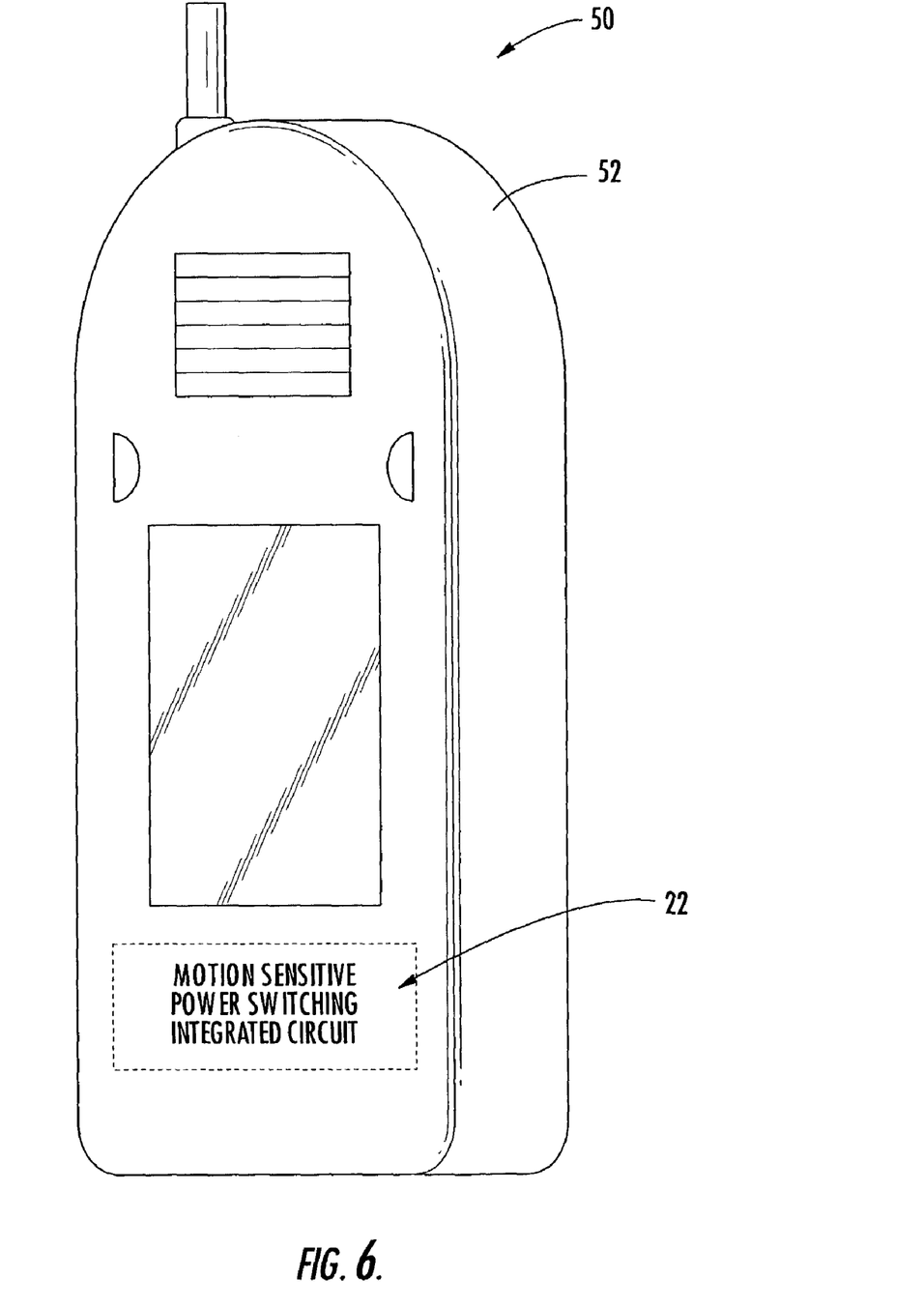
FIG. 6 is a perspective schematic view of another electronic device (i.e., mobile phone) including the motion sensitive power switching integrated circuit of FIG. 1.

FIG. 6 illustrates a mobile phone 50 as another example of an electronic device in which the motion sensitive power switching integrated circuit 22 may be used. Again, the motion sensitive power switching integrated circuit 22 may be in the housing 52 of the mobile phone 50 so that movement of the mobile phone results in power being supplied to the internal circuitry. Otherwise, when the mobile phone 50 is off and not moved, power is off.

Figure 7:
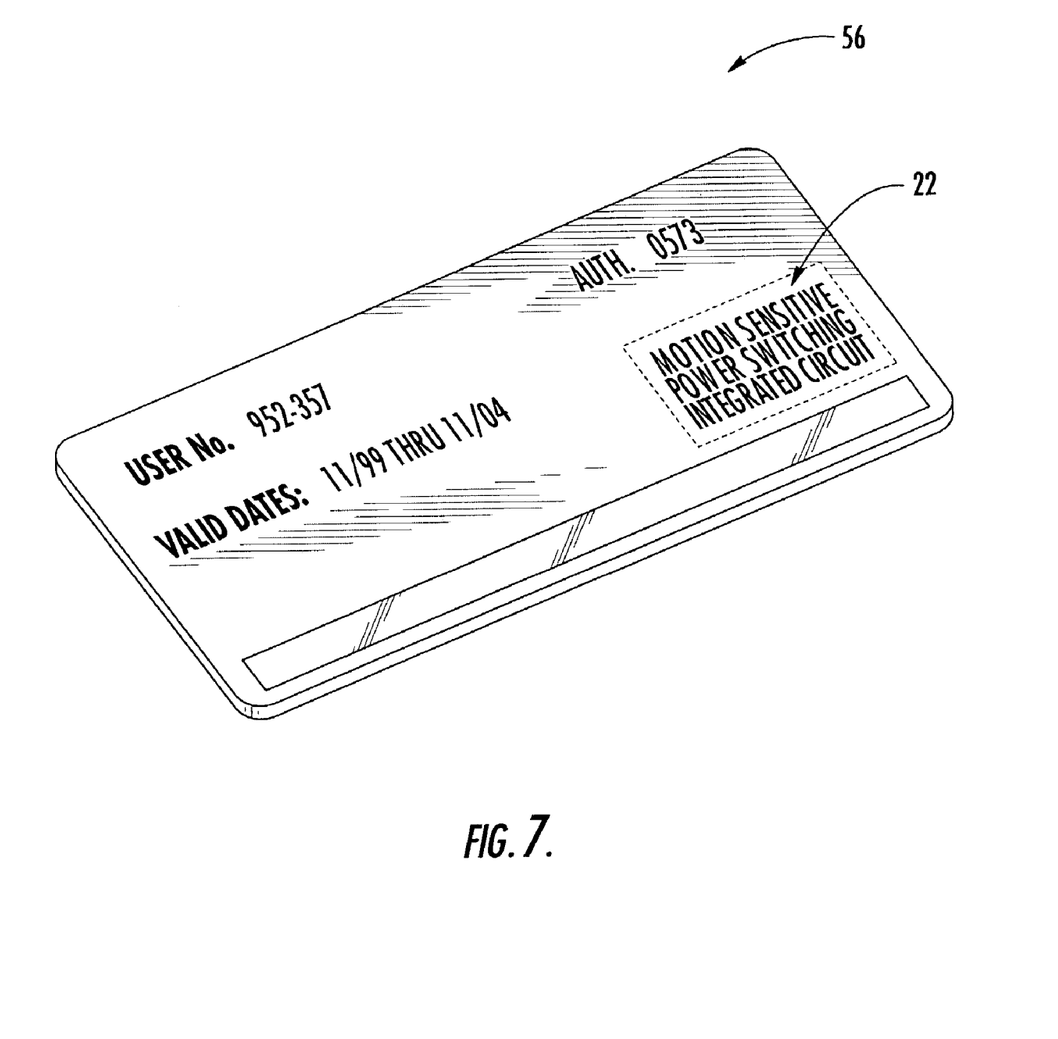
FIG. 7 is a perspective schematic view of still another electronic device (i.e., a smart cart) including the motion sensitive power switching integrated circuit of FIG. 1.

Still another example of an electronic device in which the motion sensitive power switching integrated circuit 22 may be used is a smart card 56, as shown in FIG. 7. The motion sensitive power switching integrated circuit 22 is such that it may be made small enough to fit within the thin, flat substrate 54 of the smart card 56. If the smart card 56 is lying still in a wallet or alone in a desk drawer at the owner's home, for example, no power is being used. When the smart card 56 is picked up to be used by the owner, however, the motion sensitive power switching integrated circuit 22 initiates the supply of power to internal circuitry within the body 54 of the smart card 52. Similar advantages are obtained by using the motion sensitive power switching integrated circuit 22 in, for example, an electronic ID badge or other personal electronic item that, at least at times, is put away when not needed by the owner.

As will be readily appreciated by those skilled in the art, a host of other such electronic devices may similarly benefit from use of the motion sensitive power switching integrated circuit 22. Moreover, as will also be readily appreciated by those skilled in the art, the motion sensitive power switching integrated circuit 22 may be, for example, included with the circuitry of existing electronic devices so that their power consumption is improved.

An additional aspect of the invention relates to a method for selectively powering circuitry 30 connected to an output 28 of a power switch 30. The method comprises operating the power switch to supply power to the output based upon detecting at least one MEMS inertial sensing switch 32A, 32B, 32C moving from a first position to a second position based upon motion thereof. The method is illustrated in the flow diagram 60 of FIG. 8.

Figure 8:
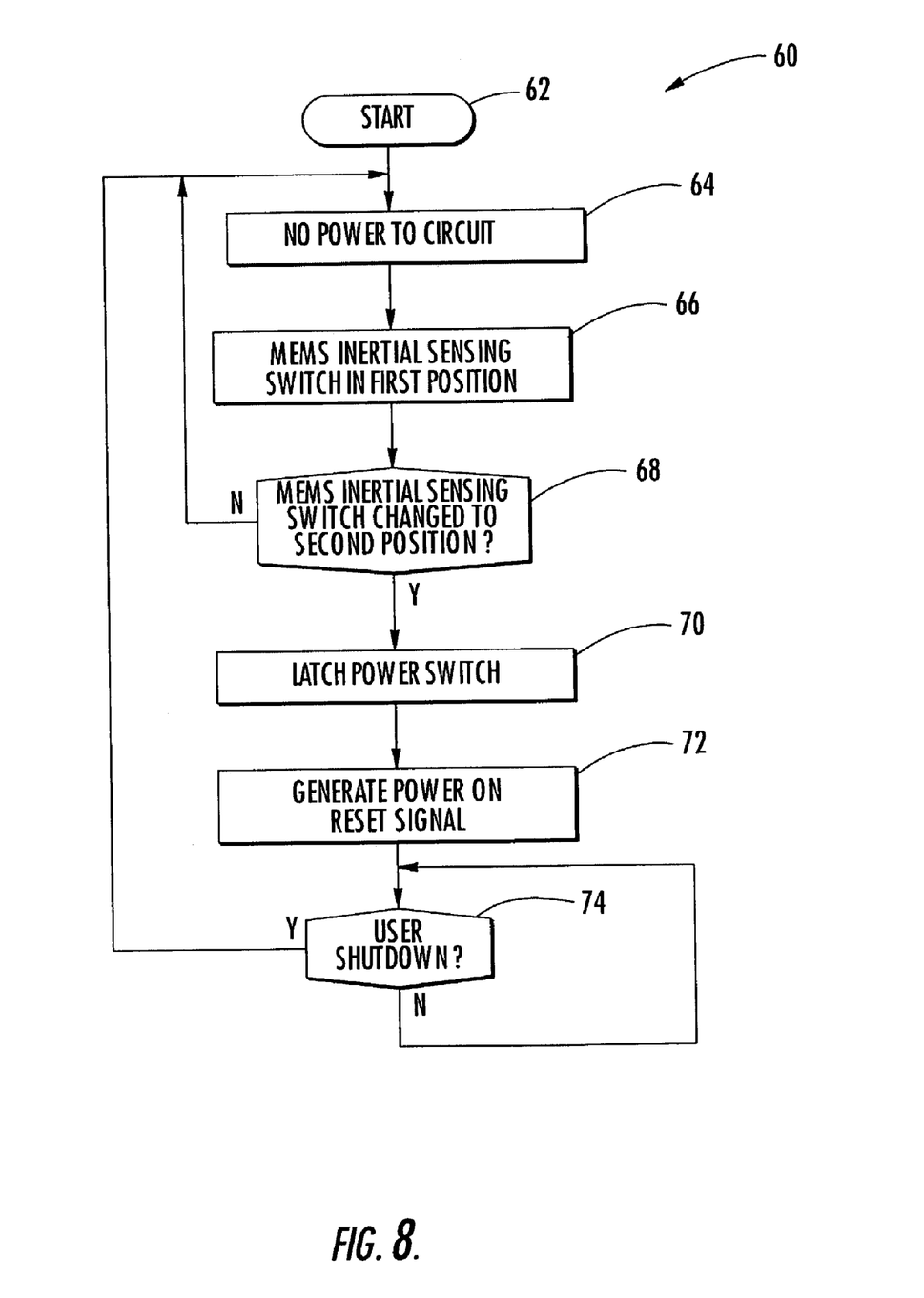
FIG. 8 is a flow diagram of a method for selectively powering circuitry connected to an output of a power switch based upon motion according to the present invention.

Upon starting (Block 62), no power is supplied at Block 64, and the at least one MEMS inertial sensing switch 32A, 32B, 32C is in a normally open position (Block 66). Accordingly, the detector 34 remains unpowered until the at least one MEMS inertial sensing switch 32A, 32B, 32C moves from the normally open position to a second, closed position.

If, at Block 68, the at least one MEMS inertial sensing switch 32A, 32B, 32C moves from its normally open to the closed position, then the power switch is latched at Block 70. At Block 72, a power on reset (POR) signal is also optionally generated based upon the at least one MEMS inertial sensing switch moving from the open to the closed position. The circuit continues to be powered until a user shuts down the device at Block 74.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and other embodiments are intended to be included within the scope of the appended claims.

That which is claimed is:

1. A motion sensitive power switching integrated circuit comprising:
   an input for connecting to a power supply;
   an output for connecting to a circuit to be selectively powered;
   a power switch connected between said input and said output;
   at least one MEMS inertial sensing switch being movable from a normally open position to a closed position based upon motion thereof; and
   a detector operating said power switch to supply power to said output from said input based upon said at least one MEMS inertial sensing switch moving from the normally open position to the closed position.

2. A motion sensitive power switching integrated circuit according to claim 1 wherein said detector remains unpowered until said at least one MEMS inertial sensing switch moves from the normally open position to the closed position.

3. A motion sensitive power switching integrated circuit according to claim 1 wherein said detector latches said power switch on based upon said at least one MEMS inertial sensing switch moving from the normally open position to the closed position.

4. A motion sensitive power switching integrated circuit according to claim 1 wherein said detector further generates a power on reset (POR) signal based upon said at least one MEMS inertial sensing switch moving from the normally open position to the closed position.

5. A motion sensitive power switching integrated circuit according to claim 4 further comprising a POR external pin connected to said detector.

6. A motion sensitive power switching integrated circuit according to claim 1 wherein said at least one MEMS inertial sensing switch comprises a plurality of MEMS inertial sensing switches connected in parallel.

7. A motion sensitive power switching integrated circuit according to claim 1 wherein said at least one MEMS inertial sensing switch comprises a plurality of MEMS inertial sensing switches each responsive to movement along a respective different axis of movement.

8. A motion sensitive power switching integrated circuit according to claim 1 wherein said power switch comprises at least one transistor having respective conduction terminals connected in series between the input and output.

9. A motion sensitive power switching integrated circuit according to claim 8 wherein said at least one transistor further has a control terminal connected to said at least one MEMS inertial sensing switch and said detector.

10. A motion sensitive power switching integrated circuit according to claim 1 wherein said power switch comprises at least one MOS transistor.

11. A motion sensitive power switching integrated circuit according to claim 1 wherein said input comprises a first external pin and said output comprises a second external pin.

12. A motion sensitive power switching integrated circuit according to claim 1 further comprising an external ground pin connected to said at least one MEMS inertial sensing switch and said detector.

13. A motion sensitive power switching integrated circuit comprising:
    an external input pin for connecting to a power supply;
    an external output pin for connecting to a circuit to be selectively powered;
    a power switch connected between said external input pin and said external output pin;
    at least one MEMS inertial sensing switch being movable from a normally open position to a closed position based upon motion thereof; and
    a detector remaining unpowered until said at least one MEMS inertial sensing switch moves from the normally open position to the closed position, and latching said power switch to supply power to said external output pin from said external input pin based upon said at least one MEMS inertial sensing switch moving from the normally open position to the closed position.

14. A motion sensitive power switching integrated circuit according to claim 13 wherein said detector further generates a power on reset (POR) signal based upon said at least one MEMS inertial sensing switch moving from the normally open position to the closed position.

15. A motion sensitive power switching integrated circuit according to claim 14 further comprising a POR external pin connected to said detector.

16. A motion sensitive power switching integrated circuit according to claim 13 wherein said at least one MEMS inertial sensing switch comprises a plurality of MEMS inertial sensing switches connected in parallel.

17. A motion sensitive power switching integrated circuit according to claim 13 wherein said at least one MEMS inertial sensing switch comprises a plurality of MEMS inertial sensing switches each responsive to movement along a respective different axis of movement.

18. A motion sensitive power switching integrated circuit according to claim 13 wherein said power switch comprises at least one transistor having respective conduction terminals connected in series between the input and output.

19. A motion sensitive power switching integrated circuit according to claim 18 wherein said at least one transistor further has a control terminal connected to said at least one MEMS inertial sensing switch and said detector.

20. A motion sensitive power switching integrated circuit according to claim 13 further comprising an external ground pin connected to said at least one MEMS inertial sensing switch and said detector.

21. A motion sensitive power switching integrated circuit comprising:
    an input for connecting to a power supply;
    an output for connecting to a circuit to be selectively powered;
    a power switch connected between said input and said output;
    at least one MEMS inertial sensing switch being movable from a first position to a second position based upon motion thereof; and
    a detector operating said power switch to supply power to said output from said input based upon said at least one MEMS inertial sensing switch moving from the first position to the second position;
    said detector further generating a power on reset (POR) signal based upon said at least one MEMS inertial sensing switch moving from the first position to the second position.

22. A motion sensitive power switching integrated circuit according to claim 21 wherein said detector remains unpowered until said at least one MEMS inertial sensing switch moves from the first position to the second position.

23. A motion sensitive power switching integrated circuit according to claim 21 wherein said detector latches said power switch on based upon said at least one MEMS inertial sensing switch moving from the first position to the second position.

24. A motion sensitive power switching integrated circuit according to claim 21 wherein said at least one MEMS inertial sensing switch comprises a plurality of MEMS inertial sensing switches connected in parallel.

25. A motion sensitive power switching integrated circuit according to claim 21 wherein said at least one MEMS inertial sensing switch comprises a plurality of MEMS inertial sensing switches each responsive to movement along a respective different axis of movement.

26. A motion sensitive power switching integrated circuit according to claim 21 wherein said power switch comprises at least one transistor having respective conduction terminals connected in series between the input and output.

27. A motion sensitive power switching integrated circuit according to claim 26 wherein said at least one transistor further has a control terminal connected to said at least one MEMS inertial sensing switch and said detector.

28. An electronic device comprising:
    a power switch connected between an input and an output;
    at least one MEMS inertial sensing switch being movable from a first position to a second position based upon motion thereof; and
    a detector operating said power switch to supply power to the output from the input based upon said at least one MEMS inertial sensing switch moving from the first position to the second position.

29. An electronic device according to claim 28 wherein said detector remains unpowered until said at least one MEMS inertial sensing switch moves from the first open position to the second position.

30. An electronic device according to claim 28 wherein said detector latches said power switch on based upon said at least one MEMS inertial sensing switch moving from the first position to the second position.

31. An electronic device according to claim 28 wherein said detector further generates a power on reset (POR) signal based upon said at least one MEMS inertial sensing switch moving from the first position to the second position.

32. An electronic device according to claim 28 wherein said at least one MEMS inertial sensing switch comprises a plurality of MEMS inertial sensing switches connected in parallel.

33. An electronic device according to claim 28 further comprising a substrate on which said power switch, said at least one MEMS inertial sensing switch and said detector are formed.

34. An electronic device according to claim 33 further comprising circuitry on said substrate and connected to the output of said power switch.

35. An electronic device according to claim 33 further comprising at least one other substrate and circuitry thereon and being connected to the output of said power switch.

36. A method for selectively powering circuitry connected to an output of a power switch and based upon motion, the method comprising:

operating the power switch to supply power to the output based upon detecting at least one MEMS inertial sensing switch moving from a first position to a second position based upon motion thereof.

37. A method according to claim 36 wherein the first position is normally open position and the second position is a closed position.

38. A method according to claim 37 wherein detecting comprises using a detector that remains unpowered until said at least one MEMS inertial sensing switch moves from the normally open position to the closed position.

39. A method according to claim 36 further comprising latching the power switch on based upon the at least one MEMS inertial sensing switch moving from the first position to the second position.

40. A method according to claim 36 further comprising generating a power on reset (POR) signal based upon the at least one MEMS inertial sensing switch moving from the first position to the second position.

* * * * *

UNITED STATES PATENT AND TRADEMARK OFFICE
CERTIFICATE OF CORRECTION

PATENT NO. : 7,084,762 B2 Page 1 of 1
APPLICATION NO. : 10/340131
DATED : August 1, 2006
INVENTOR(S) : Pedrazzini et al.

It is certified that error appears in the above-identified patent and that said Letters Patent is hereby corrected as shown below:

On the Title Page, Item (*) Notice    Delete: "271 days"
Insert: --274 days--

Column 3, Line 5    Delete: "diagram yet"
Insert: --diagram of yet--

Column 10, Line 10    Delete: "is normally"
Insert: --is a normally--

Signed and Sealed this

Seventh Day of August, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,084,762 B2 | Page 1 of 1 |
| APPLICATION NO. | : 10/340131 | |
| DATED | : August 1, 2006 | |
| INVENTOR(S) | : Pedrazzini et al. | |

It is certified that error appears in the above-identified patent and that said Letters Patent is hereby corrected as shown below:

Title Page, item (75)  Delete: "Giorgio Pedrazzini, Rancho Santa Margarita, CA (US); Ernesto Lasalandra, San Donato Milanese (IT); Bendetto Vigna, Potenza (IT)"

Insert: -- Giorgio Pedrazzini, Rancho Santa Margarita, CA (US); Ernesto Lasalandra, San Donato Milanese (IT); Benedetto Vigna, Potenza (IT) --

Signed and Sealed this
Eighteenth Day of March, 2014

Michelle K. Lee
*Deputy Director of the United States Patent and Trademark Office*